Patented Aug. 20, 1940

2,211,796

UNITED STATES PATENT OFFICE 2,211,796

MANUFACTURE OF ALKALI EARTH CARBONATES

Kurt Schneider, Woodside, N. Y.

No Drawing. Application December 3, 1937,
Serial No. 177,899

11 Claims. (Cl. 23—66)

This invention relates to the manufacture of alkali earth carbonates and particularly to the manufacture of such carbonates in the form of very finely divided, discrete particles of substantially uniform size.

Alkali earth carbonates are useful as pigments and fillers in many industrial operations. One of the most extensive uses of such materials is as a filler in rubber goods. For example, large quantities of calcium carbonate are employed in the manufacture of automobile and other tires. These materials also may be used as a filler and adulterant in paints and in the manufacture of putty, cosmetics, plastics, sized paper and dentifrices. For most of these uses it is desirable to employ materials of very fine particle size and, since it is extremely difficult to grind these compounds into particles of sufficient fineness, they can be produced in the desired form most readily by precipitating them as freshly prepared carbonates.

Carbonates of the alkali earth metals have previously been made by treating slurries of alkali earth hydroxides in water with carbon dioxide gas. In most processes of this nature, the slurries are treated by bubbling carbon dioxide gas therethrough and maintaining the temperature of the mixture relatively low by cooling coils or other suitable means. However the particles so produced vary in size in accordance with the conditions under which the reaction occurs and unless special precautions are taken the particles will be large and will tend to agglomerate. It has also been the practice in some instances to add a protective colloid to the carbonates before dehydrating them to assist in maintaining the particles in dispersible form.

An object of this invention is to provide simple, effective, rapid and economical methods of producing alkali earth carbonates.

A further object of the invention is the provision of methods of making finely divided alkali earth carbonate particles which are substantially uniform in size, do not tend to agglomerate and may be readily dispersed throughout compositions containing them.

In accordance with one embodiment of the invention, a suspension or solution of an alkali earth compound, such as the hydroxide, is caused to react with a water solution of carbonic acid under pressure to produce a carbonate of the alkali earth metal. Preferably a protective agent, such as a protective colloid is added to the alkali earth containing mixture before the carbonic acid solution is combined therewith to prevent growth of the carbonate particles as they are formed, to prevent agglomeration thereof on drying and to facilitate their dispersion in subsequent use.

The above described and other objects and features of the invention will be apparent from the following detailed description of specific embodiments of the invention. It is, of course, to be understood that the examples disclosed herein are given for the purpose of illustration and not as a measure of the scope of the invention.

It has been found that in the treatment of alkali earth compounds with carbon dioxide gas the carbon dioxide gas reacts with both the suspended and dissolved alkali earth compounds. For example, in the treatment of milk of lime with carbon dioxide gas to produce calcium carbonate, the calcium hydroxide is in the form of a suspension containing a relatively small amount of calcium hydroxide in solution. The carbon dioxide gas is bubbled through the milk of lime maintained at atmospheric pressure and the suspended calcium hydroxide particles are thereby transformed into calcium carbonate, probably without first going into solution. Consequently, the particle size of the carbonate thus formed is predetermined by the size of the calcium hydroxide particles from which it has been formed.

The calcium hydroxide in solution is similarly acted upon by the carbon dioxide but, since the calcium carbonate produced in considerably less soluble than the hydroxide, most of the resulting carbonate goes out of solution and precipitates upon the suspended carbonate particles which have been produced by the carbonation of the suspended calcium hydroxide. As a result, the particles of calcium carbonate which are produced are larger than are required in many industrial operations and it is desirable to eliminate or diminish as much as possible the effect of the precipitated calcium carbonate upon the size of the particles.

Another disadvantage of the use of carbon dioxide gas for the carbonation of alkali earth compounds, particularly the hydroxides, is the limited solubility of the reacting materials and the fact that they are in different phases, the carbon dioxide being a gas and the alkali earth hydroxide being present principally in a solid state and to a much less limited extent in solution. These difficulties can be overcome to some extent by employing apparatus for effecting intimate contact between the reacting materials, but, in any event, it will take a considerable period of time to effect complete reaction.

Still another objection to the use of carbon dioxide gas for carbonating these materials is the fact that the effect of the heat generated in the reaction must be counteracted by cooling the mixture, by diluting the carbon dioxide gas, or else by causing the reaction to proceed at an extremely slow rate in order to maintain the temperature within the desired range. If the temperature of the mixture is not maintained at a relatively low value, the rate of growth of the particle size is greatly accelerated.

These various disadvantages are overcome to a large extent by the processes embodying the invention and by following these improved processes alkali earth carbonates of extreme fineness and uniformity may be rapidly produced. In accordance with one specific embodiment of the invention, calcium carbonate is produced by reacting upon milk of lime in a pressure tight container with carbonic acid dissolved in water. In carrying out this process a solution of carbonic acid in water is prepared by compressing carbon dioxide gas or a gas, such as flue gas, containing it, cooling the compressed gas and passing it through an absorption tower through which a stream of water is passing in a counter current direction. The amount of carbonic acid retained in solution in the water varies with the pressure, the temperature, and the concentration of carbon dioxide in the gas employed. The maximum concentration of the carbonic acid in water which may be obtained at a temperature of 0° C. and at a pressure of about 38 atmospheres is about 7.5%, as calculated on the basis of $CO_2$ content. The solution of carbonic acid employed may be of any desired concentration up to about 7.5% $CO_2$.

If liquid carbon dioxide is employed to make the carbonic acid solution and a relatively high pressure is maintained, a higher carbonic acid concentration than is theoretically possible may result because some of the carbon dioxide is dispersed or retained in suspension in the water. The excess carbon dioxide acts as a reservoir to supply additional carbonic acid as the reaction with the calcium hydroxide proceeds and by the use of such solutions containing an excess of carbon dioxide more highly concentrated carbonate slurries will be obtained than would normally be the case with the usual solutions of carbonic acid.

To the solution of carbonic acid in water is added an equivalent quantity of a dispersion of calcium hydroxide in water. In order to obtain the final carbonate slurry at a high concentration, it is preferable to use milk of lime containing calcium hydroxide, calculated on the basis of CaO content, of from about 15 to 20%, although other concentrations may be used. For example, in order to obtain a slurry containing about 10% calcium carbonate about 72 pounds of the carbonic acid solution containing about 6% $CO_2$ are added to approximately 28 pounds of milk of lime containing about 20% CaO. The reacting liquids are stored in suitable containers, from which they are conveyed into a suitable pressure tight mixing compartment where the reaction occurs. Very satisfactory results may be obtained by pumping the reacting liquids through a mixing valve. The resulting carbonate slurry is then dewatered in a filter or a centrifuge and the wet cake thus obtained is dried by any suitable means common to the art.

It has been found that particles of much finer size may be obtained by including in the milk of lime mixture a protective agent which will form a protective film around the hydroxide particles which is permeable by the carbonic acid but which tends to prevent the precipitation of new carbonate material upon individual carbonate particles which are already present, thereby eliminating or diminishing particle size growth. Thus the protective agent prevents the precipitation upon the carbonate particles obtained by carbonating the suspended hydroxide, of the carbonate particles produced from the dissolved calcium hydroxide.

The protective agents cling tenaciously to the alkali earth hydroxide particles and are retained thereby even after the particles have been transformed into carbonates and remain with the dried carbonate particles. The fact that the particles retain the protective agents even in the dry state is advantageous because they keep the particles from caking and materially accelerate the dispersion of the particles throughout compounds to which they are added in industry. Consequently, the protective agent which is added to the hydroxide suspension should be selected so that it will not interfere with the later use of the finished product.

Among the protective agents which may be employed are sulfonated castor oil, sulfonated higher alcohols, for example, gardenole, fatty oils, such as rosin oil, olive oil, sperm oil, cocoanut oil, etc. and other common reagents, such as casein, gelatine, tragacanth, glue, soap, etc. which form protective colloids.

Since one of the important uses for calcium carbonate particles is in the manufacture of rubber products and cocoanut oil is unobjectionable in such compounds, the latter material may be employed as the protective agent in the manufacture of this product. In practice it has been found that satisfactory results may be obtained by adding to the milk of lime a quantity of cocoanut oil equivalent to about 5 to 15% of the CaO present therein. On this basis a quantity of cocoanut oil equivalent to about 2% of the total suspension may be added to a milk of lime suspension containing 20% CaO.

It has been found that when milk of lime is reacted upon by a solution of carbonic acid in water, calcium carbonate is produced almost instantaneously, whereas in the process formerly known it takes anywhere from thirty minutes to several hours to obtain this result. It is believed that the rapidity of the improved reaction results from several factors among which are the elimination of the time necessary for the absorption of the carbon dioxide gas in the usual process by the water and the fact that the reaction in the process embraced by this invention occurs between a liquid phase and a suspension or a solution rather than between a gaseous phase and a suspension or solution.

The addition of a protective agent to the alkali earth hydroxide before the carbonation occurs is another important feature of the invention. By the use of an agent of this type at this particular point in the process, alkali earth carbonates of much finer particle size may be produced than would be obtained if the protective agent were added at a later stage. In addition, the protective agent will tend to prevent agglomeration of the particles during drying and will facilitate the disperson of the finished product when it is mixed with other materials.

The carbonation of alkali earth hydroxide with carbonic acid dissolved in water also has considerable advantage from a thermo chemical standpoint over the usual process employing carbon dioxide gas. For example, if milk of lime is carbonated with carbon dioxide gas, about 27 calories of heat are liberated per mole of reacting material and the heat evolved manifests itself by an increase in the temperature of the reaction mixture. With concentrated milk of lime mixtures this temperature rise is considerable and will cause an undesirable growth in the particle size unless it is corrected by cooling the reaction mixture, by diluting the carbon dioxide added, or by retarding the rate at which the carbon dioxide is added and simultaneously cooling the mixture, all of which methods are undesirable from the economic standpoint. However, if the reaction is carried out with carbonic acid dissolved in water, the heat generated by the reaction amounts to only about 18 calories per mole of reacting material, or about one third less than results from the use of carbon dioxide gas, and the increase in temperature is correspondingly less. Due to this fact, it is possible to carry out the reaction with a solution of carbonic acid in water without resorting to artificial cooling unless calcium carbonate slurries containing considerably more than 10% calcium carbonate are produced.

By a similar process, carbonates of the other alkali earth metals may be produced by reacting upon their hydroxides with water solutions of carbonic acid to which protective agents may or may not be added as desired. Similar results may also be obtained by treating solutions of soluble alkali earth compounds with solutions of carbonic acid. For example, calcium carbonate particles of fine size may be obtained by treating with carbonic acid solutions such compounds as calcium saccarates, for example calcium sucrate, calcium cyanamid, etc. While the calcium carbonate particles thus obtained are not quite so fine as those produced by the carbonation of the hydroxide, they are nevertheless sufficiently fine to be used with satisfactory results for many purposes and are finer than would result from the use of carbon dioxide gas. If protective agents are added to the solutions of soluble alkali earth compounds before they are caused to react with the carbonic acid solutions, the size of the particles obtained will be materially reduced.

In the production of calcium cyanamid by the interaction of nitrogen and calcium carbide a crude product is first obtained and an impure carbonate of fine particle size may be made by causing a water solution of carbonic acid to react with a slurry of this crude material. The resulting carbonate may be used for some purposes without further purification or may, if desired, be treated to remove the impurities which are present.

By practicing this invention alkali earth carbonates having extremely desirable properties are obtained. These carbonates are made up of very minute particles which are substantially uniform in size, which do not tend to cake and which may be readily dispersed throughout compositions containing them. Calcium carbonate produced in accordance with the invention is extremely effective as a filler for use in rubber mixes, such as are employed in the manufacture of rubber tires.

The processes employed in manufacturing these products are extremely simple, rapid and economical, but are nevertheless effective in producing a uniform product of high quality.

What is claimed is:

1. The process of making calcium carbonate of fine particle size which comprises causing milk of lime to react with a separately prepared water solution of carbonic acid.

2. The process of making calcium carbonate of fine particle size which comprises causing milk of lime containing a protective agent which diminishes particle size growth to react with a separately prepared water solution of carbonic acid.

3. The process of making calcium carbonate of fine particle size which comprises causing milk of lime containing a fatty oil which diminishes particle size growth to react with a separately prepared water solution of carbonic acid.

4. The process of making calcium carbonate of fine particle size which comprises causing milk of lime containing cocoanut oil to react with a separately prepared water solution of carbonic acid.

5. The process of making calcium carbonate of fine particle size which comprises causing a liquid containing a compound from the group consisting of calcium hydroxide, calcium saccarate and calcium cyanamid to react with a separately prepared water solution of carbonic acid.

6. The process of making calcium carbonate of fine particle size which comprises causing a liquid containing a protective agent and a compound from the group consisting of calcium hydroxide, calcium saccarate and calcium cyanamide to react with a separately prepared water solution of carbonic acid.

7. The process of making calcium carbonate of fine particle size which comprises causing milk of lime to react with a separately prepared saturated water solution of carbonic acid containing an excess of liquid carbon dioxide.

8. The process of making calcium carbonate of fine particle size which comprises causing milk of lime containing a protective agent to react with a separately prepared saturated water solution of carbonic acid containing an excess of liquid carbon dioxide.

9. The process of making calcium carbonate of fine particle size which comprises causing milk of lime to react with a substantially equivalent quantity of a separately prepared water solution of carbonic acid having a $CO_2$ content of about 6%.

10. The method of making calcium carbonate of fine particle size which comprises causing milk of lime containing a quantity of cocoanut oil equivalent to 5–15% of the CaO content of the milk of lime to react with a substantially equivalent quantity of a separately prepared water solution of carbonic acid having a $CO_2$ content of about 6%.

11. The process of making calcium carbonate of fine particle size which comprises causing milk of lime containing a protective agent from the group consisting of sulfonated castor oil, cocoanut oil, casein, gelatin, tragacanth, glue and soap to react with a separately prepared solution of carbonic acid.

KURT SCHNEIDER.